United States Patent [19]
Kemp, Jr. et al.

[11] Patent Number: 4,809,992
[45] Date of Patent: Mar. 7, 1989

[54] ROTARY SHAFT SEAL ASSEMBLY

[75] Inventors: Dennis E. Kemp, Jr., Maplewood, N.J.; David Bowers, Bath, Me.

[73] Assignee: Woodex Bearing Company, Inc., Georgetown, Me.

[21] Appl. No.: 124,087

[22] Filed: Nov. 23, 1987

[51] Int. Cl.4 .................. F16J 15/18; F16J 15/28; F16J 15/34

[52] U.S. Cl. .................. 277/63; 277/65; 277/81 R; 277/81 S; 277/105; 277/124; 277/125; 277/187; 277/194; 277/197; 277/220

[58] Field of Search .................. 277/81 R, 81 S, 192, 277/197, 105, 187, 117, 119-122, 123-125, 95, 188 A, 65, 63, 194, 220

[56] References Cited

U.S. PATENT DOCUMENTS

| 927,156 | 7/1909 | Menczer | 277/121 |
|---|---|---|---|
| 2,342,092 | 2/1944 | Scribner | 277/65 X |
| 2,460,952 | 2/1949 | Simer et al. | 277/81 R X |
| 2,831,713 | 4/1958 | Smith | 277/65 |
| 3,015,505 | 1/1962 | Smith | 277/65 |
| 3,300,225 | 1/1967 | Shepler | 277/187 |
| 3,473,814 | 10/1969 | Bastow | 277/188 A |
| 3,591,188 | 7/1971 | Eisner | 277/65 X |
| 3,771,801 | 11/1973 | Burke | 277/188 A |
| 3,833,226 | 9/1974 | Kerns | 277/65 X |
| 3,920,252 | 11/1975 | Dechavennt | 277/188 A |
| 3,988,026 | 10/1976 | Kemp, Jr. | 277/65 X |
| 4,062,549 | 12/1977 | Kemp, Jr. | |
| 4,217,980 | 8/1980 | Kemp, Jr. | |
| 4,413,831 | 11/1983 | Washida et al. | 277/95 X |
| 4,470,607 | 9/1984 | Schier | 277/119 X |
| 4,504,065 | 3/1985 | Devint | 277/105 X |
| 4,576,384 | 3/1986 | Azlbert | 277/81 S |

FOREIGN PATENT DOCUMENTS

| 217677 | 10/1958 | Australia | 277/81 |
|---|---|---|---|
| 662059 | 8/1929 | France | 277/81 R |
| 885446 | 9/1943 | France | 277/187 |
| 746852 | 3/1956 | United Kingdom | 277/105 |
| 1558425 | 1/1980 | United Kingdom | 277/188 A |

Primary Examiner—Allan N. Shoap
Attorney, Agent, or Firm—Mark T. Basseches; Paula T. Basseches

[57] ABSTRACT

A rotary seal comprises an elastomeric sleeve adapted to be mounted on a shaft, a pair of washers encompassing the ends of the sleeve, wear plates engaged against the anti-friction washers, and a compression device for urging the washers toward each other axially to foreshorten the sleeve and define between the sleeve and washers a torque driving connection, said washers being formed of anti-friction polymeric material and said wear plates being formed of metal or vice versa.

7 Claims, 2 Drawing Sheets

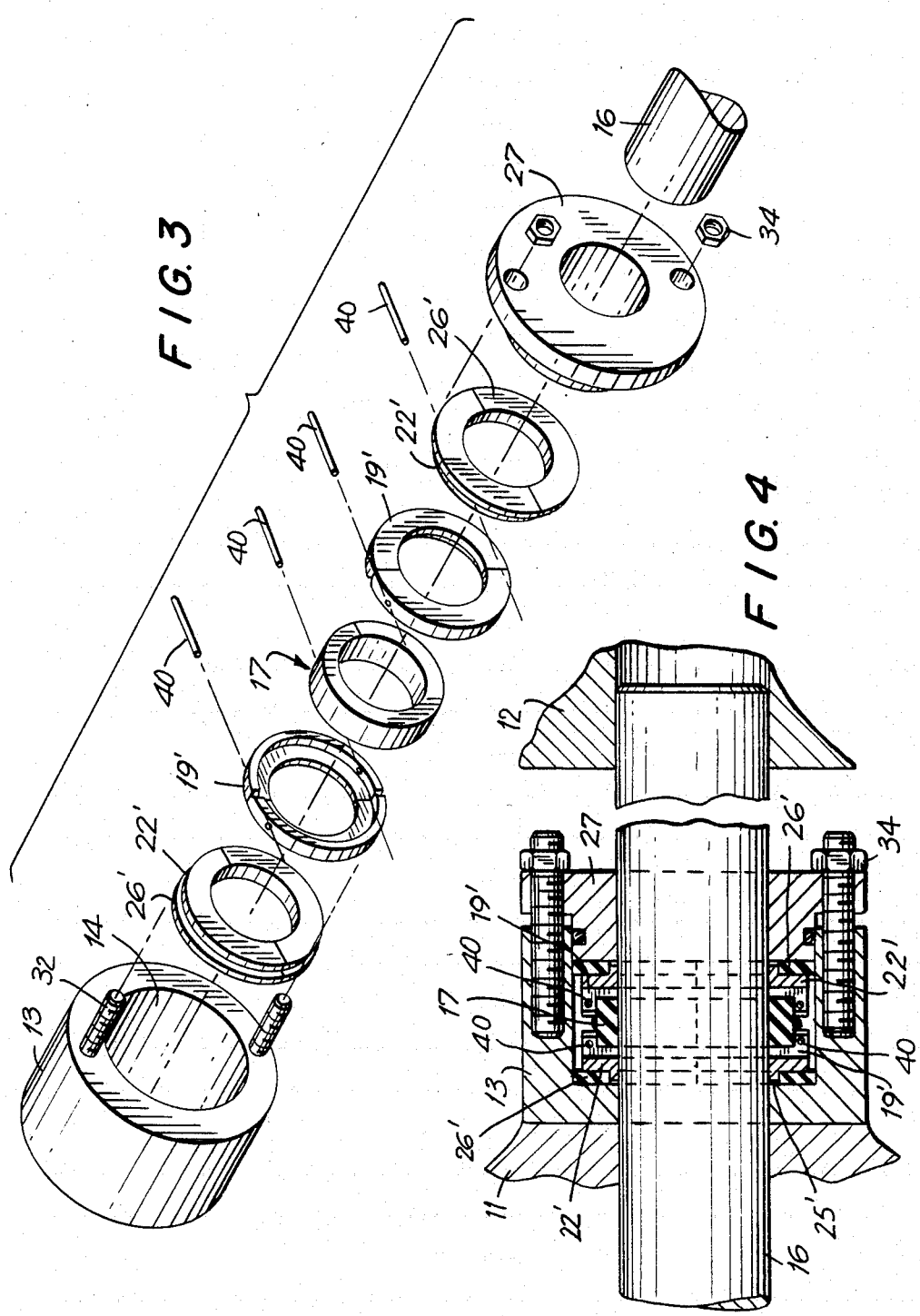

ROTARY SHAFT SEAL ASSEMBLY

BACKGROUND OF THE INVENTION

1. Field of the Invention

The present invention is in the field of rotary seals and is directed more particularly to a rotary seal assembly adapted as a substitute or replacement for conventional compression packings used in rotary equipment and known generally as stuffing box assemblies.

2. The Prior Art

It is conventional in rotary devices which include both a driver element and a driven element to interpose a rotary seal arrangement, known generally as a stuffing box, at the interface between the shaft and the motor and/or driven device. The purpose of the rotary seal is to prevent contamination of the internal components of the motor, such as by water (where the motor is used to drive a pump) or by other contaminants.

A conventional stuffing box is comprised of a cylindrical chamber surrounding the shaft, which chamber may be either integral with or fixed to the housing of the motor. The chamber is partially filled with an annular convolution or convolutions of packing directly surrounding the shaft. The packing typically comprises fibrous materials which have been permeated with lubricants.

The stuffing box includes a follower gland which enters into the chamber and bears against the packing. Compression means, such as adjustable bolts, are provided for advancing the follower gland toward the motor, thereby applying axial compressive forces against the packing. As a result of such compressive forces, the confined packing is subjected to a radial compressive force exerted against the shaft, whereby a rotary seal is formed at the interface between the outside diameter of the shaft and the inner circumference of the packing.

Stuffing box constructions as described are subject to numerous disadvantages. These disadvantages include the fact that the stuffing must be rapidly replaced when the lubricant components are exhausted, with the resultant necessary disassembly and down-time of the apparatus.

Additionally, since the effectiveness of the seal between packing and the shaft is a function of the compression applied to the packing, frequent readjustment of the compression means is necessitated as a result of wear of the packing and/or loss of lubricant.

Since the effectiveness of the seal provided by a stuffing box is a function of intimate engagement of packing against the rotating shaft surface, a balance must be struck between high compression of the packing, with resultant effective seal but high torque loss (braking action) and reduced compression of packing, with lower torque loss but reduced sealing action.

It will be readily recognized that all stuffing box constructions involve a degree of shaft wear in the area engaged by the packing.

A further and significant drawback of stuffing box seals resides in the ineffectiveness of such seals where the shaft exhibits any degree of eccentricity as respects the housing.

Various seal structures have been proposed by a coinventor hereof for use in industrial applications, such seals being embodied in the following U.S. Pat. Nos.: 4,365,707 of Dec. 28, 1982; 4,217,980 of Aug. 19, 1980; 4,062,549 of Dec. 13, 1977; 3,988,026 of Oct. 26, 1976.

However, insofar as is known, no effective seal constituting a ready substitute for the conventional stuffing box has been available.

SUMMARY OF THE INVENTION

The present invention may be summarized as directed to an improved rotary shaft seal adapted to function as a substitute for mechanical packings, and in many instances as a retrofit for existing stuffing box devices.

The invention is further directed to a rotary seal assembly which provides a highly effective sealing action with substantially lower torque loss than is the case with conventional stuffing box seals.

Still a further object of the invention is the provision of a rotary seal which may be used in conjunction with devices wherein substantial eccentricities exist between the rotating shaft and the apparatus driving the shaft and/or to which the shaft is attached.

In accordance with an embodiment of the invention, there is provided a seal of the type described which may be retrofit without the necessity of separating the shaft from the driven device, the seal components being assemblable about the shaft, i.e. without access to a shaft end.

More particularly, the invention is directed to a rotary seal assembly comprising a high friction elastomeric sleeve member mounted on the shaft to define a seal between the sleeve and shaft. The outer periphery of the sleeve is encompassed within flange portions of a pair of polymeric anti-friction washers, the outermost faces of which washers are disposed in a plane normal to the axis of rotation of the shaft.

The washers and sleeve are disposed within an annular housing having a first end or wear plate which may be integral with or separate from the housing assembly, the end or wear plate bearing against one of the polymeric washers.

The assembly includes a second end plate which surrounds the shaft and enters into the chamber defined by the housing, the second end plate bearing against the planar surface of the other washer.

Compression means are provided for variably urging the movable end plate toward the first mentioned end plate to exert a variable compressive force against the components. As a result of this compressive force, the sleeve is foreshortened and caused to be urged into driving connection with the polymeric washers. Due to the elastomeric nature of the sleeve, the same is caused radially to expand to ensure tight coupling to the washers and the flange portions. The compressed sleeve, due to its tendency to expand axially, maintains the driving connection notwithstanding wear of the polymeric washers, the wear plate, or misadjustment of the compression means.

During rotation of the shaft a seal about the periphery of the shaft is formed by the sleeve, and the wiping engagement between the washers and wear plates in a plane perpendicular to the axis of rotation provides a seal against contamination around the exterior of the assembly.

The noted construction has been found to provide an equivalent sealing action to a properly adjusted packing filled stuffing box with torque loss of only about one third of the torque loss experienced with a comparably sealing stuffing box. The seal can accommodate, without compromise of its effectiveness, significant shaft eccentricities since such eccentricities merely involve a lateral shifting of the wiping surfaces of the washers and wear plates in a direction perpendicular to the axis of rotation.

The device has the further advantage of requiring little or no adjustment of the compression means after a first desired compression is achieved, and the components seldom, if ever, require replacement. This is in contrast to stuffing box devices which require frequent adjustment and replacement of packing.

Accordingly, it is an object of the invention to provide an improved rotary shaft seal.

A further object of the invention is the provision of a device of the type described wherein torque loss is minimal as compared with conventional stuffing box devices.

Still a further object of the invention is the provision of a device of the type described which may be used to retrofit or as a substitute for conventional packing equipped stuffing box devices.

Still a further object of the invention is the provision of a device of the type described wherein the seal assembly may be repaired and/or replaced without requiring access to a shaft end.

To attain these objects and such further objects as may appear herein or be hereinafter pointed out, reference is made to the accompanying drawings forming a part hereof in which:

FIG. 3 is an exploded perspective view of a further embodiment of the invention;

FIG. 4 is a vertical section through the assembled embodiment depicted in FIG. 3.

Figure 1:
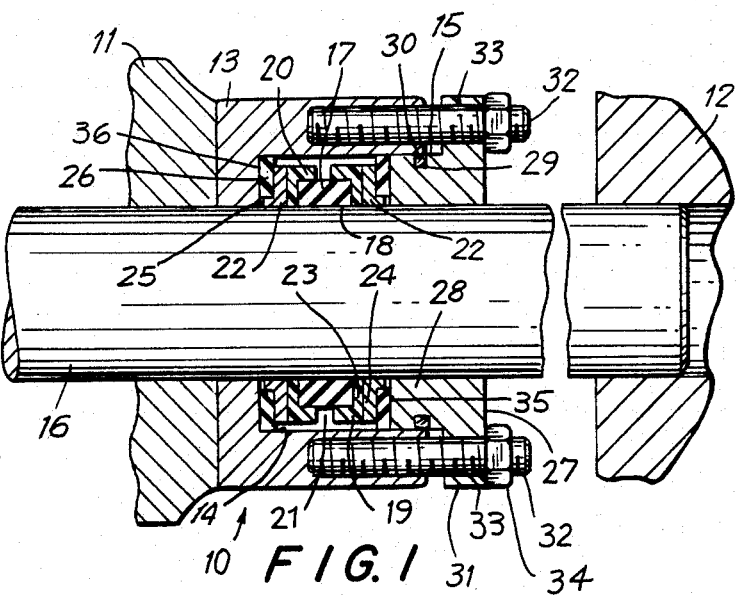
FIG. 1 is a cross-sectional view of a seal device in accordance with the invention in the relatively uncompressed condition thereof.

Turning now to the drawings, there is disclosed in FIG. 1 a rotary seal assembly 10 interposed between a drive motor 11 and a driven member 12, illustratively the impeller of a pump. The seal assembly includes an annular housing 13 which, in the illustrated embodiment, has been depicted as comprising a separate element affixed to the motor 11 but which, as will be readily recognized, may be formed integrally with the motor.

The housing 13 includes an annular bore 14 having an outwardly open mouth 15. The housing coaxially surrounds the drive shaft 16. Mounted on the shaft 16 is an axially elongated elastomeric sleeve 17 formed of neoprene or a like high friction, readily deformable rubber-like composition.

The sleeve 17 includes a central bore 18 which intimately encompasses the external diameter of the shaft 16 to define a seal at the interface of the sleeve and shaft.

To each side of the sleeve 17 there is provided a polymeric washer 19. Since the washers are identical, the description of one will suffice.

The washers include annular flanges 20 which intimately encompass the outer periphery of the sleeve 17, the flanges of the respective washers 19 being in opposed relation and defining therebetween a space 21. The washers are preferably formed of an anti-friction composition such as nylon, Delrin or Teflon (trademarks of DuPont Corporation).

First and second wear plates 22, 22 are disposed at opposite sides of the washers 19. Since the wear plates are identical, a description of one will suffice.

The wear plates are preferably comprised of corrosion-resistant metal, such as stainless steel or the like.

The adjacent faces 23, 24 of the washers and wear plates, respectively, are planar and are aligned in a direction perpendicular to the axis of shaft 16. While it is feasible in certain precisely manufactured devices for the wear plates 22 to be formed integrally with the end plates of the housing, it is preferred in usual installations to employ separate wear plates as disclosed.

The wear plates 22 include axially directed annular flanges 25, which flanges engage against the inner apertures of resilient elastomeric gaskets 26, 26. A gland follower 27 includes an inwardly directed boss 28 which intimately fits within the bore 14 of the housing 13. Preferably the boss includes an annular, outwardly directed seat 29, within which is mounted O-ring 30, defining a static seal between the follower and bore 14 of the housing 13.

The follower 27 includes a radially extending flange 31. Threaded means are provided for adjustably shifting the follower 27 inwardly of the housing 13. In the illustrated embodiment, the adjusting means comprise studs 32 embedded in the housing 13 and lying parallel to the axis of shaft 16. The flange 31 of the follower includes apertures 33 aligned with the studs 32. Clamp nuts 34 mounted on the studs and bearing against the follower may be tightened adjustably to shift the follower inwardly of the housing.

Obviously the tightening assembly above described may be comprised of other means for effecting progressive compression of the seal components, i.e. may include headed bolts extending through flange 31 and projecting into tapped bores in housing 13.

Figure 2:
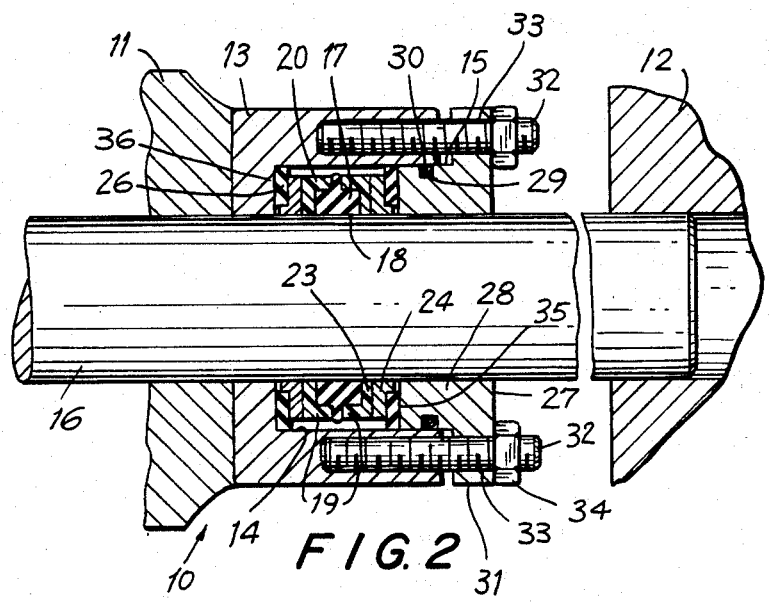
FIG. 2 is a view similar to FIG. 1 showing the position of the parts after compression has been applied.

The elements of the seal device are shown in FIG. 1 in a relatively unstressed condition. When the nuts 34 are tightened to the condition shown in FIG. 2 it will be obvious that radially extending end wall 35 of the follower 27 will engage against gasket 26, urging the seal components in a leftward direction when viewed in the orientation of FIGS. 1 and 2 and compressing the other gasket 26 against end wall 36 of the housing 13.

The tightening movements described will result in a foreshortening of the sleeve 17, with concomitant partial extrusion of the sleeve into the space 21. The tightening also assures intimate contact between the components of the sleeve abutting the washers 19 and the adjacent washer surfaces.

There is accordingly formed a torque transmitting relation between the high friction sleeve and the washers. The tightening action described also forces the engaging planar surfaces of the washers 19 and wear plates 22 into intimate sliding engagement.

From the foregoing description it will be appreciated that when the shaft 16 is rotated the sleeve 17 will drive the washers 19 which slidably engage wear plates 22.

Accordingly, an effective moving seal is defined between the engaged surfaces of the washers and wear plates, preventing the passage of fluids or like contaminants across the interface. Similarly, contaminants and fluids are precluded from passing along the shaft by the engagement of the outer surface of the shaft with the inner circumference of sleeve 17 which is compressed against the shaft by the resilience of the sleeve as augmented by the radial inward compressing forces of the flanges of washers 19.

It is to be noted that the compression effected by washers 19 on the partially encompassed sleeve 17 results in a synergistic series of results which beneficially affect the action of the seal.

The compressive forces urge the sleeve more tightly into engagement with the shaft. Also, by permitting elements of the sleeve to extrude radially into the space between the washers, the sleeve, upon wear of the outer wiping surface of the washers or the wear plates, will expand axially and maintain the desired wiping engagement of these components, thereby assuring effective torque transmission to the washers and sealing over protracted periods with a minimum of compression adjustment.

Optionally, a purging duct may be formed radially through the housing and enter the bore in the area between gaskets 26 to permit flushing of the housing.

It will also be perceived that the seal is capable of accommodating significant eccentricities of the shaft relative to the housing. This is so because eccentricities of the shaft will merely result in radial movement of the washers relative to the wear plates, i.e. in a direction perpendicular to the shaft as the shaft rotates.

For the same reasons, the seal will also compensate for slight angular divergence between the axis of rotation of the shaft and the housing.

As will be evident from the above description, the drag exerted by the seal will be a function of the degree of tightness of the nuts 34 and the initial adjustment should be effected with an eye to the pressure required to be resisted by the seal and the amount of torque loss which is tolerable. In any event, the torque loss for comparable seal efficiency is only about one third of the torque loss encountered in the use of conventional packing filled stuffing boxes.

It will also be noted that despite protracted use there is no possibility of shaft wear as is the case with stuffing boxes but, rather, any wear is confined to the components of the rotary seal.

There is shown in FIGS. 3 and 4 a rotary seal device in accordance with an embodiment of the invention. The seal device of FIGS. 3 and 4 is essentially identical to the seal device of FIGS. 1 and 2 with the exception that washers 19' and wear plates 22' have been formed in two halves, and sleeve 17' and gaskets 26' either in two parts or a single part split to permit mounting over the shaft. The halves of the washers 19' are provided with means, such as pairs of bolts 40, for interconnection of the halves.

By forming the noted components of split construction it is possible to replace the components of the rotary seal without separating the drive shaft 16 from either the drive motor or the driven apparatus.

The assembly is accomplished by removing the prior components, assembling the two washers 19' over the band forming sleeve 17' through the use of fasteners 40 and simply positioning the half components of wear plates 22' and gaskets 26' about the shaft.

When follower gland 27 is sleeved within the bore 14 of housing 13 and bolts 34 are tightened, the parts will be maintained in their desired relationship by the tightening tension.

In this connection it is noted that the annular flanges 25' of the wear plates 22', upon tightening of the threaded compression means will result in a radial outward deflection of gasket halves 26', and radial inward shifting of the wear plate halves 22', such that the seam between the wear plate halves will be completely closed, maintaining a sealed relation and minimizing resistance to rotation.

From the foregoing it will be appreciated that there is disclosed in accordance with the invention an inexpensive yet highly efficient rotary seal possessing numerous advantages over conventional stuffing box seals.

As will be apparent to skilled workers in the art familiarized with the instant disclosure, numerous variations in details of construction may be effected without departing from the spirit of the invention. Accordingly the invention is to be broadly construed within the scope of the appended claims.

By way of example, it is feasible, and in some instances preferrable, to form the wear plates of polymeric material and the sleeve encompassing washers of steel or a like metallic material. Also, while the stuffing box containing the seal has been illustrated as mounted on the motor, it is conventional for such devices to be mounted on the driven device.

Having thus described the invention and illustrated its use, what is claimed as new and is desired to be secured by Letters Patent is:

1. A rotary shaft seal assembly comprising, in combination, an elongate, axially expansible high friction elastomeric sleeve adapted to be mounted in sealing and encompassing relation over a shaft, first and second washers disposed adjacent the distal ends of said sleeve, said washers including opposed, axially directed flange portions encompassing external surfaces of said sleeve adjacent said ends, first and second annular wear plates engaging the respective surfaces of said washers remote from said sleeve, said wear plates including axially outwardly directed flanges, an annular housing having a bore encompassing said sleeve, washers and wear plates, said housing including an end wall and a follower movable in said bore toward and away from said end wall, elastomeric gasket members interposed respectively between one said wear plate and said end portion of said housing and between the other said wear plate and said follower member, said gasket members being centrally apertured, said flanges of said wear plates being disposed within said apertures of said gasket members, and compression means for urging said wear plates against said washer, thereby to axially foreshorten said sleeve and compress said sleeve about said shaft, said washers being formed of a first material and said wear plates being formed of a second material, one of said first and second materials consisting essentially of a polymeric material and the other of said first and second materials consisting essentially of metal.

2. A seal assembly in accordance with claim 1 wherein said sleeve, washers, wear plates and gaskets are split whereby they are adapted to be mounted over said shaft without access to an end portion of said shaft.

3. A rotary shaft assembly comprising, in combination, an elongate, axially expandable high friction elastomeric sleeve having an inner peripheral bore adapted to be mounted in sealing and encompassing relation over a shaft, first and second washers disposed adjacent the distal ends of said sleeve, said washers including a central aperture through which said shaft is adapted to pass, the sleeve-adjacent surfaces of said washers including opposed flange portions encompassing and engaging external surfaces of said sleeve, the ends of said flanges being spaced one from the other, the surfaces of said washers remote from said sleeve being planar and aligned perpendicular to the axis of said shaft, first and second aperture wear plates having planar surfaces, a planar surface of each wear plate being disposed in parallel sliding engagement with a respective said planar surface of said first and second washers, said wear plates including axially outwardly directed flanges, a housing having a bore encompassing said sleeve, washers and wear plates, said housing including an apertured end portion, a follower member axially movable mounted in said bore, elastomeric gasket member interposed respectively between one said wear plate and said end portion of said housing and between the other said wear plate and said follower member, said gasket members being centrally apertured, said flanges of said wear plates being disposed within said apertures of said gasket members, and adjustment means for urging said follower toward said end portion, thereby to compress said gasket members and bias said planar surfaces of said washers and wear plates against each other and said sleeve-adjacent surface of said washers against said ends of said sleeve, axially to compress said sleeve, said washers being formed of a first material and said wear plates being formed of a second material one of said first and second materials consisting essentially of an anti- friction polymeric material and the other of said first and second materials consisting essentially of metal.

4. Apparatus in accordance with claim 3 wherein said bore of said housing is cylindrical, and the peripheries of said gasket members are disposed in sealed engagement with said bore.

5. A seal assembly in accordance with claim 3 wherein each of said wear plates and washers is defined of separable parts adapted to be assembled about said shaft.

6. A seal assembly in accordance with claim 5 wherein said sleeve is comprised of a band adapted to be formed into an annular configuration about said shaft, said band being retained in said annular configuration by said washers.

7. A seal assembly in accordance with claim 6 and including fastener means for holding said parts of said washers in said encompassing relation of said sleeve.

* * * * *